United States Patent Office 3,364,191
Patented Jan. 16, 1968

3,364,191
OLEFIN-AROMATIC HYDROCARBON COPOLYMERS
George R. Donaldson, Barrington, and Richard S. Corey, Rolling Meadows, Ill., assignors to Universal Oil Products Company, Des Plaines, Ill., a corporation of Delaware
No Drawing. Filed Nov. 3, 1964, Ser. No. 408,651
12 Claims. (Cl. 260—93.7)

ABSTRACT OF THE DISCLOSURE

Preparation of solid polymers by the copolymerization of benzene and naphthalene hydrocarbons, preferably benzene, with mono-olefins, such as ethylene and propylene, in the presence of an aluminum-fluorine catalyst.

---

This invention relates to a process for the production of solid polymers. More specifically, the invention is concerned with a process for the copolymerization of an aromatic hydrocarbon and an unsaturated or olefinic hydrocarbon in the presence of certain catalytic compositions of matter whereby the finished product will comprise a solid polymeric composition of matter.

It has now been discovered that solid polymeric compositions of matter of varying hardness and flexibility may be prepared by copolymerizing certain aromatic compounds with olefinic hydrocarbons in the presence of a particular composition of matter, said copolymerization being effected under polymerization conditions of temperature and pressure which will be hereinafter set forth in greater detail. The solid polymers which are prepared according to the process of this invention may be utilized in various means, the end use depending to a great extent upon the particular hardness or flexibility of the polymer. For example, if the polymer possesses a relatively high degree of flexibility, it may be utilized to form articles of commerce wherein said flexibility is of particular advantage, such uses including pipes, hoses, tubing, etc. However, if the solid polymer which is prepared possesses relatively little flexibility, said product may be used per se or as an element of other plastics, resins, etc. where the finished molded product must retain a fairly rigid form and will not bend or flex; such molded products will include architectural forms, motor housings, dishware including cups, plates, bowls, etc.

It is therefore an object of this invention to provide a process for the preparation of a solid polymeric composition of matter.

A further object of this invention is to provide a process for the copolymerization of an aromatic hydrocarbon with an olefinic hydrocarbon in the presence of a catalytic composition of matter to prepare solid polymeric compositions of matter.

In a broad aspect one embodiment of this invention resides in a process for the preparation of a solid polymer which comprises copolymerizing an aromatic hydrocarbon and an olefinic hydrocarbon at polymerization conditions in the presence of a polymerization catalyst comprising an alumina-fluorine composite, and recovering the resultant solid polymer.

A further embodiment of this invention is found in a process for the preparation of a solid polymer which comprises copolymerizing an aromatic hydrocarbon and an olefinic hydrocarbon at a temperature in the range of from about 50° to about 500° C. and at a pressure in the range of from about 500 to about 2,500 pounds per square inch in the presence of a polymerization catalyst comprising an alumina-fluorine composite, and recovering the resultant solid polymer.

A specific embodiment of this invention is found in a process for the preparation of a solid polymer which comprises copolymerizing benzene and ethylene, said benzene being present in a molar excess over said ethylene, at a temperature in the range of from about 50° to about 500° C. and at a pressure in the range of from about 500 to about 2,500 pounds per square inch in the presence of a polymerization catalyst comprising an alumina-fluorine composite, said fluorine being present in an amount within the range of from about 1% to about 2% by weight of the alumina, and recovering the resultant solid polymer.

Other objects and embodiments will be found in the following further detailed description of this invention.

As hereinbefore set forth, it has now been discovered that solid polymeric compositions of matter may be prepared by copolymerizing an aromatic hydrocarbon with an olefinic hydrocarbon in the presence of certain catalytic compositions of matter comprising a fluorided alumina catalyst system at polymerization conditions. The preferred aromatic hydrocarbon which is used as one of the copolymerization elements comprises benzene. Other aromatic hydrocarbons such as toluene, o-xylene, m-xylene, p-xylene, ethylbenzene, naphthalene, 1-methylnaphthalene, 2-methylnaphthalene, etc. may be used although not necessarily with equivalent results. Examples of olefinic hydrocarbons which may be copolymerized with the aforementioned aromatic hydrocarbons include ethylene, propylene, 1-butene, 2-butene, etc., the preferred olefinic hydrocarbon comprising ethylene.

The copolymerization reaction is effected at elevated temperatures and pressures, the temperature being in a range of from about 50° up to about 500° C. or more, the preferred temperature being in a range of from about 200° to about 300° C. The pressure which is utilized will be in a range of from about 500 up to about 2,500 pounds per square inch and preferably in a range of from about 1,000 to about 2,000 pounds per square inch. In addition, the aromatic hydrocarbon will be present in a molar excess over the olefinic hydrocarbon, said excess being a mole ratio of from about 6 moles to about 12 moles of aromatic hydrocarbon per mole of olefinic hydrocarbon. Liquid hourly space velocities (the amount of liquid charge per amount of catalyst per hour) will be in a range of from about 0.5 up to about 10 and preferably in a range of from about 1.5 up to about 3.0. The catalyst which is utilized for the process of this invention comprises a fluorided alumina system which contains from about 1% to about 2% by weight of fluorine based on the weight of the catalyst base. The catalyst is prepared by adding hydrogen fluoride to an alumina sol which is thereafter dried.

The process of this invention may be effected in any suitable manner and may comprise either a batch or continuous type operation, the preferred method being a batch type operation. When such an operation is used, a quantity of the aromatic hydrocarbon is placed in an appropriate apparatus such as, for example, a rotating autoclave which contains a predetermined amount of the polymerization catalyst comprising a fluorine-alumina composite. The autoclave is sealed and the olefinic hydrocarbon is added thereto in either a gaseous or liquid form. If the olefinic hydrocarbon is in gaseous form, the desired pressure may be attained by use of the gaseous olefinic hydrocarbon per se or, if so desired, the desired pressure may be reached by pressing in an additional amount of an inert gas such as nitrogen until the desired pressure has been reached. If the olefinic hydrocarbon is in liquid form, the desired pressure is attained by use of the aforesaid inert gas. Upon attainment of the desired pressure, the autoclave and contents thereof are then heated to the predetermined polymerization temperature and maintained thereat for the reaction time which may range from about 0.25 hour up to about 10 hours or more. The residence time is just one of the many variables concerned with the process of this invention, other variables which include temperature, pressure, etc. being dependent upon the particular aromatic hydrocarbon and olefinic hydrocarbon undergoing copolymerization. Upon completion of the desired residence time, the autoclave and contents thereof are allowed to cool to room temperature, the excess pressure is vented, and the autoclave is opened. The solid polymeric product is recovered, separated from any unreacted starting materials and catalyst which may be present, purified and recovered by conventional means.

It is also contemplated within the scope of this invention that the process of the present invention may also be effected in a continuous type operation. When such a process is used, a quantity of the aromatic hydrocarbon which is to undergo cross-polymerization is introduced to the reaction zone containing the desired polymerization catalyst comprising a fluorine-alumina composite, said zone being maintained at the proper operating conditions of temperature and pressure. The olefinic hydrocarbon is also charged to the reactor through separate means, usually being diluted by the co-introduction of an inert solvent or diluent such as nitrogen, ethane, etc. Upon completion of the desired residence time which, as hereinbefore set forth, is dependent upon the particular reactants undergoing cross-polymerization, the effluent is continuously discharged. Inasmuch as the desired polymeric product is normally solid in nature, it is contemplated that higher temperatures and pressures will be required for this type of operation than will be necessary when utilizing a batch type operation in order to prevent the outlet lines from being plugged due to the formation of the solid polymeric composition of matter. The desired product is separated from unreacted starting materials and side products and recovered by conventional means. Due to the particular nature of the catalyst which is used in this polymerization reaction, a suitable method of effecting the polymerization comprises a fixed bed method in which the catalyst is positioned as a fixed bed in the reaction zone and the reactants are passed over said catalyst bed in either an upward or downward flow. Other types of continuous operations which may be utilized to effect the cross-polymerization between the olefinic hydrocarbon and the aromatic hydrocarbon comprise a moving bed type in which the catalyst and reactants pass either concurrently or countercurrently to each other while passing through the reaction zone, and the slurry type of operation in which the catalyst is carried into the reaction zone as a slurry in one or both of the starting materials.

As hereinbefore set forth, the particular physical characteristics of the solid polymers may be varied by utilizing different reaction conditions; for example, the use of a lower pressure will result in the obtention of a polymer which is more flexible in nature than one which is obtained when utilizing a higher pressure. Similar changes in physical characteristics will be observed when varying the temperature at which the reaction is run, the mole excess of aromatic hydrocarbon to olefinic hydrocarbon and the liquid hourly space velocity.

The following examples are given to illustrate the process of the present invention which, however, are not intended to limit the generally broad scope of the present invention in strict accordance therewith.

*Example I*

In this example a catalyst was prepared by adding hydrogen fluoride to an alumina sol in an amount so that the finished catalyst, after drying, contained 1.70 wt. percent fluorine. The catalyst in an amount of 100 cc. was placed in a reactor provided with heating and pressure means. The catalyst was purged with hydrogen at a temperature level of 550° C. and at a pressure of 0 pounds per square inch for a period of 5 hours. Following this, benzene was charged to the reactor at a rate of about 87 grams per hour. The reactor was maintained at a pressure of about 1,500 pounds per square inch and a temperature of about 235° C. Ethylene was also charged to the reactor while being diluted with nitrogen so that the ethylene content of the gaseous charge was 50%. The amount of ethylene charged amounted to about 7.5 grams per hour, the liquid hourly space velocity being about 1.5 on the benzene plus ethylene charge with an accompanying benzene to ethylene mole ratio of about 6:1. At the end of the desired residence time, there was recovered a hard, somewhat flexible, solid polymeric composition of matter. This material was white in appearance and softened upon heating. The polymer thus obtained contained both benzene and ethylene and possessed a relatively high molecular weight.

*Example II*

The above experiment was repeated by charging benzene to a reactor which was maintained at a temperature of about 242° C. Following this, ethylene in a nitrogen diluent was also charged to the reactor, said ethylene being present in a 50 mole percent based on the total ethylene/nitrogen charge. The combined liquid hourly space velocity of the benzene plus ethylene was 1.56, the mole ratio of benzene to ethylene being 6.38 moles of benzene per mole of ethylene. The difference between this experiment and the one set forth in Example I above was that the pressure of the reactor was varied, said pressure in this example being only 1,000 pounds per square inch as compared to the 1,500 pounds per square inch utilized in Example I.

The polymeric composition of matter which was recovered from this operation comprised a white solid which was of lower molecular weight than the polymer obtained in Example I and, in addition, was more flexible in nature than the previous polymeric composition of matter.

*Example III*

In this example a catalyst is prepared in a manner similar to that set forth in Example I above. A reactor is loaded with 100 cc. of this catalyst and charged with hydrogen for a period of about 5 hours at a temperature of about 550° C. Following this, benzene is charged to the reactor along with propylene which is diluted with nitrogen so that the combined gaseous charge contains about 50% propylene by weight. The reactor is maintained at a temperature of about 240° C. and at a pressure of about 1,500 pounds per square inch. The combined liquid hourly space velocity of the benzene plus propylene charge is about 1.5, said benzene being present in an amount of about 6 moles of benzene per mole of propylene. The polymeric composition of matter which is obtained by the cross-polymerization of the benzene plus propylene will be a solid, white polymer which will soften when heated and become flexible.

We claim as our invention:

1. A process for the preparation of a solid polymer which comprises copolymerizing an aromatic hydrocarbon selected from the group consisting of benzene, alkylbenzenes, naphthalene and alkylnaphthalenes with a mono-olefinic hydrocarbon, said aromatic hydrocarbon being present in a molar excess of about 6 to about 12 moles per mole of said olefinic hydrocarbon, at a temperature in the range of from about 50° to about 500° C. and at a pressure in the range of from about 500 to about 2,500 pounds per square inch in the presence of a catalytic amount of a polymerization catalyst comprising an alumina-fluorine composite containing at least about 1% weight of fluorine based on the weight of the alumina and recovering the resultant solid polymer.

2. A process for the preparation of a solid polymer which comprises copolymerizating benzene and a mono-olefinic hydrocarbon, said benzene being present in a molar excess of about 6 to about 12 moles per mole of said olefinic hydrocarbon, at a temperature in the range of from about 50° to about 500° C. and at a pressure in the range of from about 500 to about 2,500 pounds per square inch in the presence of a catalytic amount of a polymerization catalyst comprising an alumina-fluorine composite containing at least about 1% by weight of fluorine based on the weight of the alumina, and recovering the resultant solid polymer.

3. A process for the preparation of a solid polymer which comprises copolymerizing an aromatic hydrocarbon selected from the group consisting of benzene, alkylbenzenes, naphthalene and alkylnaphthalenes and ethylene, said aromatic hydrocarbon being present in a molar excess of about 6 to about 12 moles per mole of said ethylene, at a temperature in the range of from about 50° to about 500° C. and at a pressure in the range of from about 500 to about 2,500 pounds per square inch in the presence of a catalytic amount of a polymerization catalyst comprising an alumina-fluorine composite containing at least about 1% by weight of fluorine based on the weight of the alumina, and recovering the resultant solid polymer.

4. A process for the preparation of a solid polymer which comprises copolymerizing an aromatic hydrocarbon selected from the group consisting of benzene, alkylbenzenes, naphthalene and alkylnaphthalenes and propylene, said aromatic hydrocarbon being present in a molar excess of about 6 to about 12 moles per mole of said propylene, at a temperature in the range of from about 50° to about 500° C. and at a pressure in the range of from about 500 to about 2,500 pounds per square inch in the presence of a catalytic amount of a polymerization catalyst comprising an alumina-fluorine composite containing at least about 1% by weight of fluorine based on the weight of the alumina, and recovering the resultant solid polymer.

5. A process for the preparation of a solid polymer which comprises copolymerizing benzene and ethylene, said benzene being present in a molar excess of about 6 to about 12 moles per mole of said ethylene, at a temperature in the range of from about 50° to about 500° C. and at a pressure in the range of from about 500 to about 2,500 pounds per square inch in the presence of a catalytic amount of a polymerization catalyst comprising an alumina-fluorine composite, said fluorine being present in an amount within the range of from about 1% to about 2% by weight of the alumina, and recovering the resultant solid polymer.

6. A process for the preparation of a solid polymer which comprises copolymerizing benzene and propylene, said benzene being present in a molar excess of about 6 to about 12 moles per mole of said propylene, at a temperature in the range of from about 50° to about 500° C. and at a pressure in the range of from about 500 to about 2,500 pounds per square inch in the presence of a catalytic amount of a polymerization catalyst comprising an alumina-fluorine composite, said fluorine being present in an amount within the range of from about 1% to about 2% by weight of the alumina, and recovering the resultant said polymer.

7. The process of claim 1 further characterized in that said aromatic hydrocarbon is toluene.

8. The process of claim 1 further characterized in that said aromatic hydrocarbon is a xylene.

9. The process of claim 1 further characterized in that said aromatic hydrocarbon is ethylbenzene.

10. The process of claim 1 further characterized in that sai daromatic hydrocarbon is a methylnaphthalene.

11. The process of claim 1 further characterized in that said mono-olefinic hydrocarbon is 1-butene.

12. The process of claim 1 further characterized in that said mono-olefinic hydrocarbon is 2-butene.

References Cited

UNITED STATES PATENTS 2,835,638   5/1958   Block et al. _____ 252—442

FOREIGN PATENTS 873,069   7/1961   Great Britain.

OTHER REFERENCES

Mortimer et al., J. Amer. Chem. Soc. 84, 4986–4987 (1962).

JOSEPH L. SCHOFER, *Primary Examiner.*

M. B. KURTZMAN, *Assistant Examiner.*